United States Patent [19]

Munday

[11] 4,199,821

[45] Apr. 22, 1980

[54] DATA TRANSMISSION

[75] Inventor: Peter J. Munday, Reading, England

[73] Assignee: Racal Group Services Limited, England

[21] Appl. No.: 907,206

[22] Filed: May 18, 1978

[30] Foreign Application Priority Data

May 20, 1977 [GB] United Kingdom ............... 21245/77

[51] Int. Cl.$^2$ .............................................. H03K 7/10
[52] U.S. Cl. ...................................... 375/60; 332/17;
375/42; 455/102; 455/105
[58] Field of Search .............. 179/15 BM; 325/40, 61,
325/47, 137, 139, 141, 39, 30, 163, ; 332/17, 18;
178/66, 67

[56] References Cited

U.S. PATENT DOCUMENTS

| | | | |
|---|---|---|---|
| 2,987,683 | 6/1961 | Powers | 325/137 |
| 3,054,073 | 9/1962 | Powers | 332/17 |
| 3,406,343 | 10/1968 | Mehlman | 325/139 |
| 3,868,599 | 2/1975 | Hirasaki et al. | 332/17 |

Primary Examiner—Benedict V. Safourek
Attorney, Agent, or Firm—Leydig, Voit, Osann, Mayer & Holt, Ltd.

[57] ABSTRACT

The invention is concerned with circuit arrangements which minimize, or at least reduce, the tendency for a frequency modulated signal in one transmission channel carrying digital data to interfere in an adjacent channel. There is disclosed a system for transmitting digital data by frequency-modulation of a carrier signal, in which a small amount of amplitude modulation is also introduced, the frequency and amplitude modulation being such that the resulting signal has substantially the form that a carrier, frequency-modulated by digital data, would have after having been passed through a band pass filter designed to minimize unwanted sideband levels.

8 Claims, 8 Drawing Figures

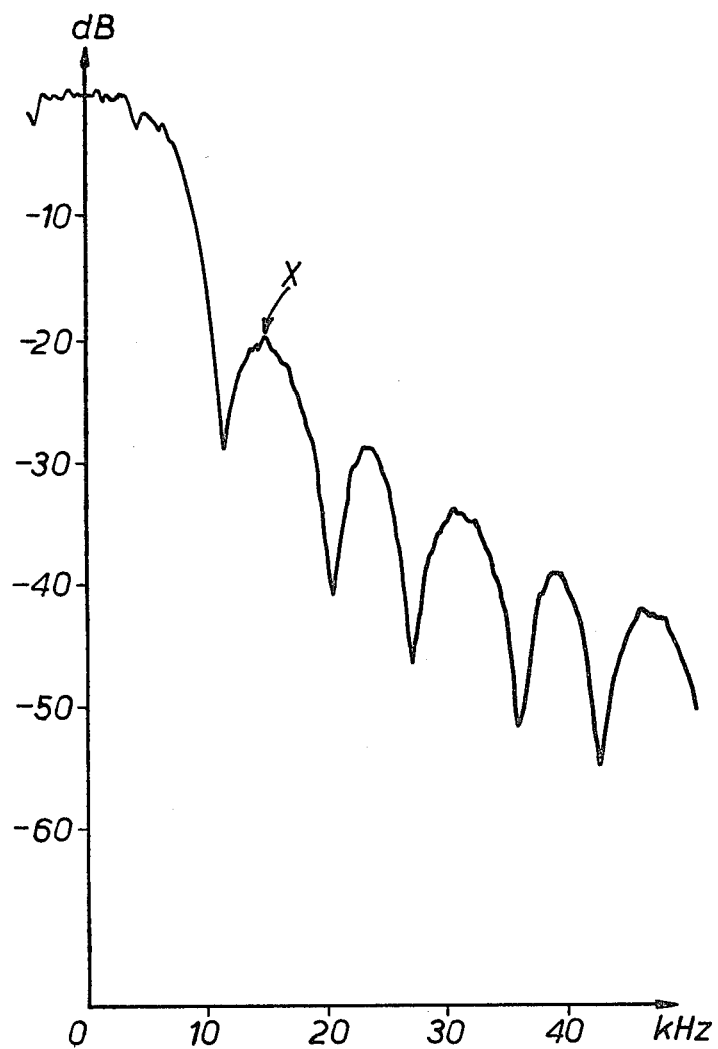
FIG. IA.

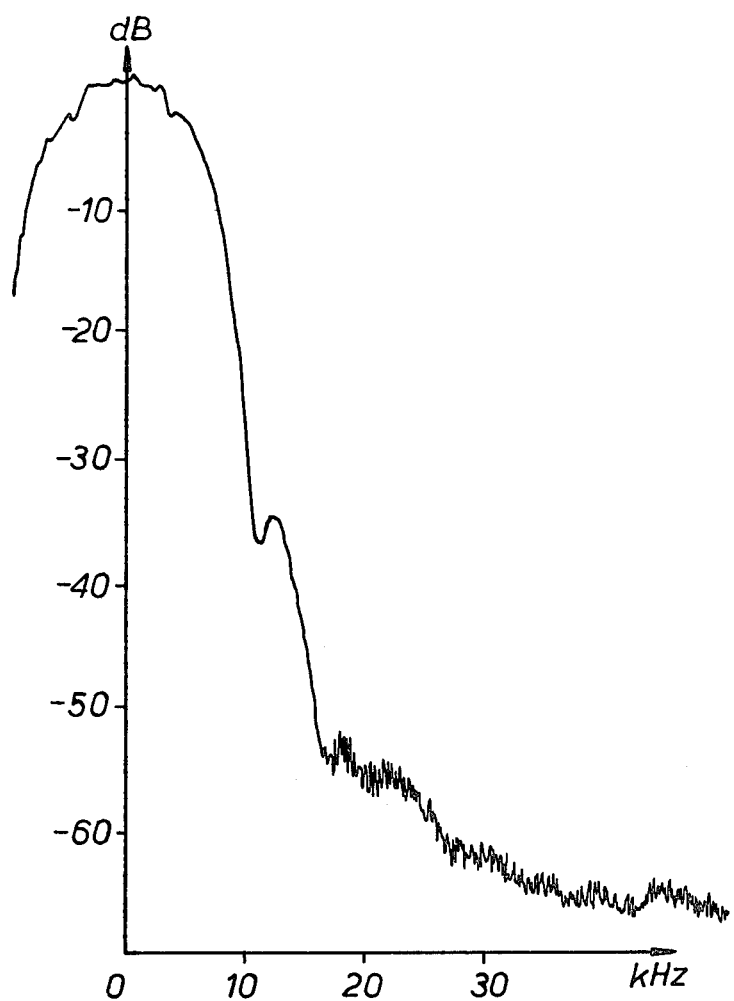
FIG. IC.

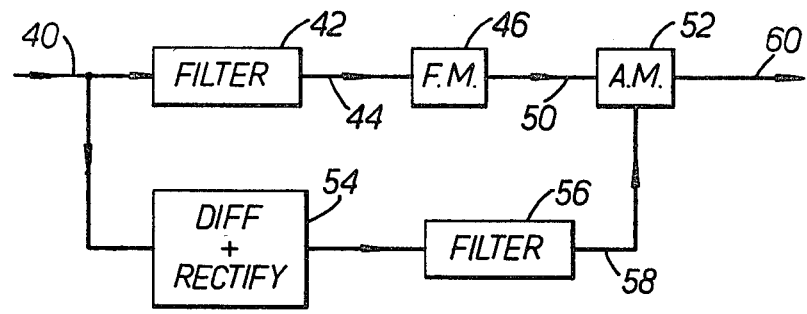
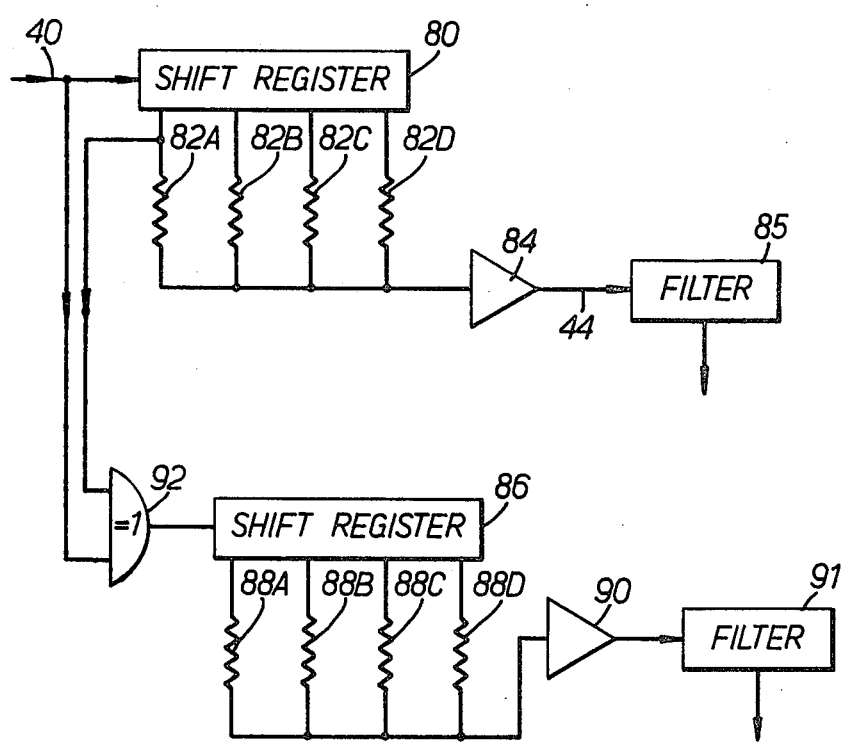
FIG.4.
FIG.5.

DATA TRANSMISSION

BACKGROUND OF THE INVENTION

The invention relates to the transmission of digital data by modulation, particularly by frequency modulation, of a carrier signal.

More specifically, the invention is concerned with circuit arrangements which minimise, or at least reduce, the tendency for a frequency modulated signal in one transmission channel carrying digital data to interfere in an adjacent channel. This tendency is particularly pronounced when the frequency deviation produced by the frequency modulation is high, such as is the case where digital data is to be transmitted by frequency modulation.

BRIEF SUMMARY OF THE INVENTION

According to the invention, there is provided a digital data transmitting system, including means for frequency-modulating a carrier signal in dependence on a digital data signal, and means for then amplitude-modulating the frequency-modulated signal in dependence on the digital data, whereby to produce changes in the value of the carrier signal so as to reduce undesired sideband signals.

According to the invention, there is also provided a system for transmitting digital data by frequency-modulation of a carrier signal, including frequency-modulating means connected to frequency-modulate a carrier signal in dependence on the digital data, amplitude-modulating means connected to receive the carrier signal for also introducing a predetermined amount of amplitude modulation, the frequency and amplitude modulation being such that the resulting signal has substantially the same form that the carrier, frequency-modulated by the digital data, would have after being passed through a band pass filter designed to minimise undesired sideband signals.

According to the invention, there is further provided a corresponding method.

DESCRIPTION OF THE DRAWINGS

A digital data transmission system embodying the invention will now be described, by way of example only, with reference to the accompanying diagrammatic drawings in which:

FIG. 1A shows the spectrum of a carrier signal frequency-modulated by digital data and not subjected to any filtering action;

FIG. 1C shows the corresponding spectrum when the carrier signal has been modulated by the circuit arrangement to be described;

FIG. 4 is a block circuit diagram of the circuit arrangement; and

FIG. 5 is a schematic circuit diagram showing part of the circuit arrangement of FIG. 4 in more detail.

DESCRIPTION OF PREFERRED EMBODIMENTS

FIG. 1A shows an experimentally obtained spectrum of a 16 kilobit per second digital frequency modulated signal not subjected to any filtering and not processed by the circuit arrangement to be described. As is apparent, the levels of the various sidebands produced are significant, and if the channel spacing of the transmission system is such that the first sideband falls inside the adjacent channel pass band, then there will be significant interference with the channels immediately adjacent to the transmission channel in which the data is being transmitted as shown at point X for example, the spectrum has a level only 20 dB down at 14.5 kHz from the carrier frequency.

Figure 1B:
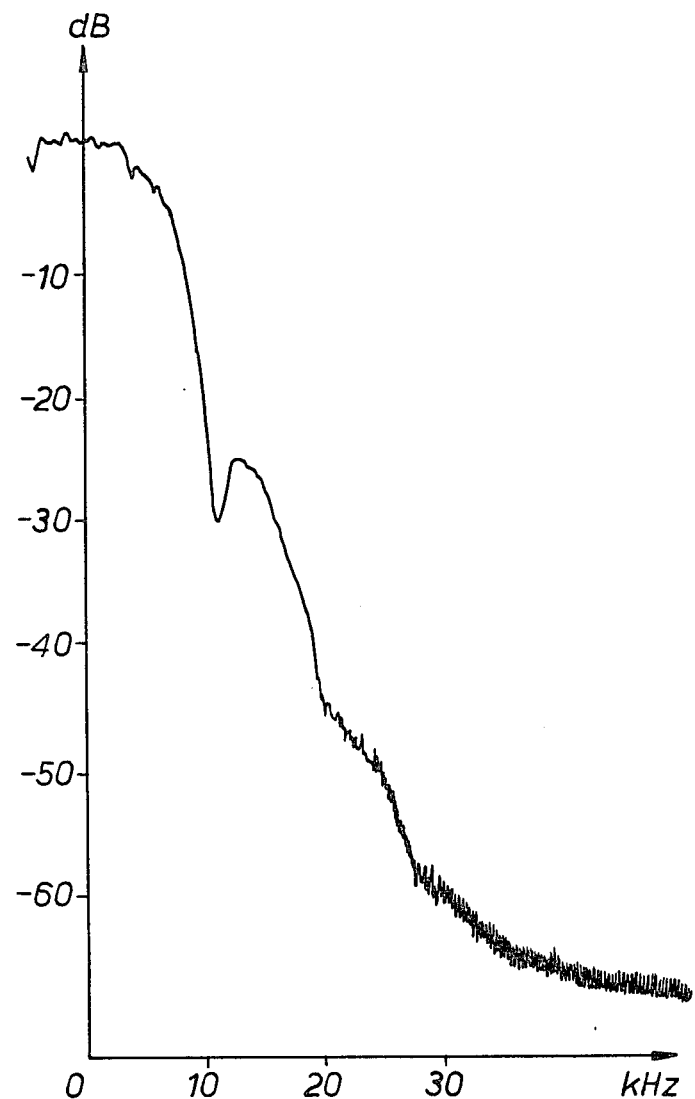
FIG. 1B shows the corresponding spectrum when the baseband waveform has been filtered to produce "raised cosine" frequency transitions.

FIG. 1B shows a corresponding, experimentally obtained, spectrum when the frequency transitions are made raised-cosinusoidal in shape. The peak of the first sideband is now at 12.5 kHz and is 26 dB down.

FIG. 1C shows the corresponding spectrum which was obtained experimentally when both amplitude and frequency modulation were applied by an example of the circuit arrangement now to be described. The first sideband level is now 35 dB down.

Figure 2A:
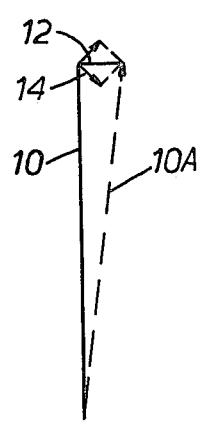
FIGS. 2A and 2B are vector diagrams illustrating the relationship between carrier amplitude modulation and sideband levels.
Figure 2B:
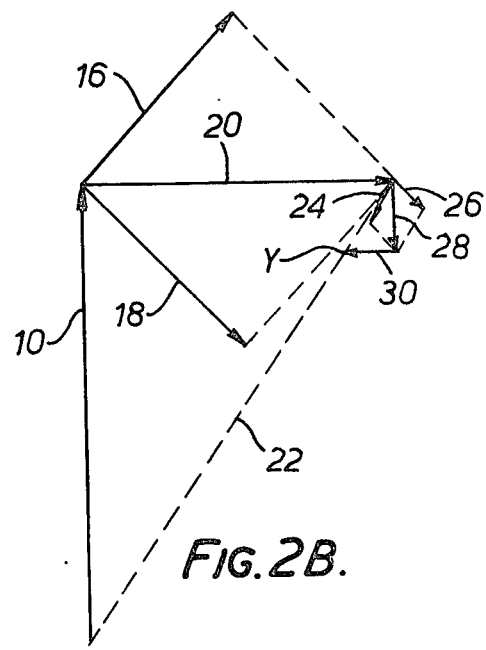

The relationship between carrier amplitude and sideband level is illustrated in FIGS. 2A and 2B.

FIG. 2A shows the vector diagram of a frequency modulated signal in which the frequency deviation is low. In FIG. 2A, the carrier is represented by the vector 10, and the effect of the frequency modulation by the small rotating vectors 12 and 14. These have the effect of angularly turning the vector 10 as shown by the dotted vector 10A, but there is insignificant change in the length of the vector, representing the carrier amplitude.

In contrast, FIG. 2B shows a vector diagram representing a case in which the frequency deviation is relatively high such as occurs with digital data transmission. Here, the effect of the frequency modulation is shown by two relatively large amplitude rotating vectors 16 and 18. These produce a resultant 20 (for the instantaneous situation illustrated in FIG. 2B), and the overall resultant, that is the resultant of the vectors 10 and 20, is a vector 22. This clearly has an amplitude significantly greater than that of the vector 10, and since the latter cannot change in amplitude, it is apparent that further vectors must be present. Thus, it can be shown that two further rotating vectors 24 and 26 are present which provide a resultant 28. Other rotating vectors (not shown) provide a further resultant vector 30, and in this way a succession of vectors of successively reducing lengths exists in order effectively to reduce the overall length of the vector 24 back to the point Y. It is these additional vectors which produce the interfering sidebands as shown in FIG. 1A.

The circuit arrangement to be described is intended to simulate a filtering action by deliberately superimposing on the carrier signal some amplitude modulation which has the effect of eliminating or offsetting these additional vectors. In other words, both frequency and amplitude modulation takes place at the transmitter in response to the digital data to be transmitted. First, there is frequency modulation constituting the effect of the rotating vectors 16 and 18 (producing the resultant vector 20), and secondly there is amplitude modulation to back off the effect of the additional vectors.

The amplitude and frequency modulation waveforms may be calculated by mathematical simulation. In this mathematical simulation, a carrier, frequency-modulated by digital data, passes through an appropriate band pass filter. The resulting signal is then analysed to obtain the time varying amplitude and frequency deviation of the carrier. In the circuit arrangement to be described, the reverse is done—the calculated amplitude and frequency waveforms are produced, such as by filters to be described, and applied to a carrier. The resulting signal is therefore the same as that which would be obtained by frequency modulating the carrier with digital data and then filtering it to reduce the unwanted sideband levels.

The optimum band pass filter to be used in the mathematical simulation depends on various parameters of the transmission system (e.g. channel spacing, adjacent channel receiver filter characteristics). Too fast a roll-off in attenuation produces a large amount of ringing in the amplitude and frequency waveforms, whereas too slow a roll-off means that there is too little sideband attenuation. A filter with a raised cosine shape in the frequency domain is a good compromise. In the simulation, the filter can be made to have a linear phase characteristic.

FIG. 4 shows a block diagram of the circuit arrangement. As shown, the digital data on an input line 40 is fed to a filter 42, to be described below, which produces a resultant frequency modulating signal on a line 44 which frequency modulates a carrier source 46. The frequency-modulated carrier is then fed on a line 50 into an amplitude-modulating unit 52.

In addition, the digital data on line 40 is fed through a differentiating and rectifying circuit 54, which thus produces a pulse in response to each transition of the digital signal, and thence to a further filter 56, to be described below, which is arranged to produce the required amplitude signal. This amplitude signal, on a line 58, is fed as the modulating signal into the amplitude modulator 52. The resultant frequency-and-amplitude-modulated signal on line 60 is then ready for transmission.

Figure 3:
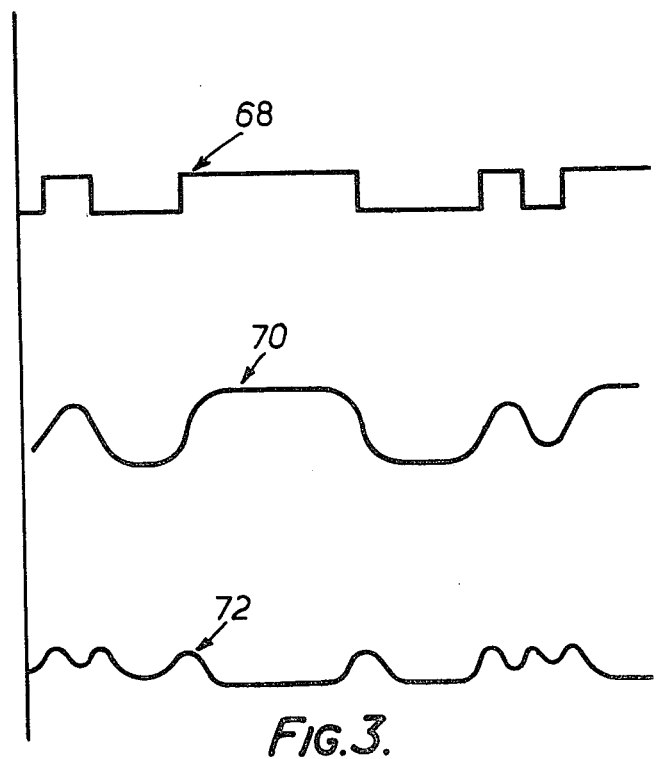
FIG. 3 illustrates waveforms occurring in the circuit arrangement.

FIG. 3 shows exemplary waveforms of, respectively, digital data (in binary form) for transmission (waveform 68) on line 40 of FIG. 4, the frequency modulating signal (waveform 70) on line 44 of FIG. 4, and the amplitude modulating signal (waveform 72) on line 58 of FIG. 4. In FIG. 3, the effects of group delay on the signals are ignored.

As previously explained, the filters 42 and 56 are designed so as to produce the requisite waveforms 70 and 72, and one way of implementing these two filters is by means of transversal filters as shown in FIG. 5.

As shown in FIG. 5, the filter 42 comprises a shift register 80 which is connected to receive the binary data on line 40, and this data is clocked through at a multiple of the predetermined bit rate. The stage outputs of the shift register 80 are all connected in parallel, through respective weighting resistors 82A, 82B, 82C, 82D . . . to a buffer amplifier 84 which produces the frequency modulating signal on line 44 (of FIG. 4). The buffer amplifier 84 may optionally be followed by a suitable low pass filter 85 to smooth the waveform.

The values of the weighting resistors 82A . . . are selected so that the output of the buffer amplifier 84 has the correct waveform (as derived by the mathematical simulation).

The filter 56 for producing the amplitude-modulating waveform on line 58 comprises a further shift register 86 having its stage outputs connected through respective weighting resistors 88A, 88B, 88C, 88D . . . to a buffer amplifier 90 which produces the modulating waveforms for line 58 of FIG. 3. The buffer amplifier 90 may optionally be followed by a suitable low pass filter 91 to smooth the data. Shift register 86 is fed with the digital data on line 40, but this digital data is not fed directly into the shift register but is fed via an EXCLUSIVE OR gate 92. One of the inputs of the gate 92 is connected to the line 40, while the other is connected to the output of the first stage of the shift register 80. The effect of the EXCLUSIVE OR gate 92 is that the shift register 86 only receives a "1" input when the binary state of the input line 40 differs from the binary state of the first stage of the shift register 80—in other words when there is a transition between two binary levels in the digital signal. The buffer amplifier 90 therefore produces an output in response to transitions of level of the data signal, and the values of the weighting resistors 88A . . . are chosen to ensure that this output has the correct shape.

It will be appreciated that FIG. 5 shows only one of various possible ways of producing the required frequency and amplitude modulating waveforms from the digital data.

By way of contrast with the spectrum shown in FIG. 1A, FIG. 1C shows how the spectrum is changed when, instead of merely using the digital data to frequency-modulate the carrier, the circuit arrangement shown in FIG. 3, incorporating both frequency and amplitude modulation, is used. As shown in FIG. 1C, the signal level at 12.5 kHz from the base band is down by 35 dB, and there are corresponding reductions at higher frequencies. The system described therefore, by modulating the signal at the transmitter in a particular way and transmitting this signal, simulates a filtering action at the transmitter.

Some advantages of simulating a post-modulation-filter in the manner described, as opposed to using an actual post-modulation-filter, are as follows:

(a) It is easier to produce an optimum simulated filter than an optimum real filter.

(b) In a variable frequency transmitter, it would be necessary to modulate at a fixed frequency if a real post-modulation-filter were used, and then to convert to the required frequency by mixing. With a simulated filter, modulation can be done at the required transmitter frequency.

(c) Real post-modulation filters (e.g. crystal filters) can only run at relatively low power, and any non-linearities in a following amplifier would reduce the benefits of the filter by distorting the amplitude modulation. Using simulated filtering as described, the amplitude modulator can be run at full power.

What is claimed is:

1. A system for transmitting digital data by frequency modulation of a carrier signal, comprising
a first filter connected to receive and filter the digital data to produce a frequency modulating signal,
frequency-modulating means connected to receive the frequency modulating signal and to frequency-modulate a carrier signal in dependence thereon,
a transition-detecting circuit connected to receive the digital data and to produce a control signal in response to each transition of the digital data, the polarity of each control signal being the same and being independent of the direction of the respective transition, a second filter connected to receive and filter the control signals to produce an amplitude modulating signal, and amplitude-modulating means connected to receive the frequency-modulated carrier signal from the frequency-modulating means and also connected to receive the amplitude modulating signal to amplitude-modulate the frequency-modulated carrier in dependence thereon and thereby to produce an output signal, the first and second filters having such predetermined characteristics that the frequency-modulating signal has smooth transitions from one value to another in response to a change in the digital data from one value to another and the amplitude modulating signal has a smooth increase in amplitude in response to each said control signal followed by a smooth decrease back towards a datum until the next control signal occurs, and the characteristics being mutually related so that the output signal has the form of a band-pass filtered signal.

2. A system according to claim 1, in which the first and second filters include transversal filters connected to receive the digital data and arranged to produce the frequency and amplitude-modulating signals.

3. An electrical system for transmitting digital data, comprising means for generating a carrier signal, a first filter having a predetermined characteristic and connected to receive and filter the digital data to produce a frequency modulating signal, the predetermined characteristic of the first filter being such that the frequency modulating signal has smooth transitions from one value to another in response to transitions of the digital data from one value to another, frequency-modulating means connected to receive the frequency modulating signal and to frequency-modulate the carrier signal in dependence thereon, whereby to produce an output signal represented by a vector which angularly turns in dependence on the value of the digital data but which is of fixed length and includes a main part on which are superimposed additional vectors which produce undesired sideband signals, a transition-detecting circuit connected to receive the digital data and to produce a control signal in response to each transition of the digital data, the polarity of each control signal being the same and being independent of the direction of each transition, a second filter having a predetermined characteristic and connected to receive and filter the control signals to produce an amplitude-modulating signal, the predetermined characteristic of the second filter being such that the amplitude modulating signal has a smooth increase in amplitude in response to each said control signal followed by a smooth decrease back towards a datum amplitude until the next control signal occurs, and amplitude-modulating means connected to receive the frequency-modulated carrier signal from the frequency-modulating means and to receive the amplitude-modulating signal and operative to amplitude-modulate the frequency-modulated carrier signal in dependence on the amplitude-modulating signal, the predetermined characteristics of the filters being such that the modulation produces amplitude changes which vary the length of the said main vector to offset the said additional vectors and reduce the undesired sideband signals.

4. A system according to claim 3, in which the first and second filters include transversal filters connected to receive the digital data and arranged to produce the frequency and amplitude-modulating signals.

5. A system according to claim 2 or 4, in which the transition-detecting circuit comprises a differentiating and rectifying circuit.

6. A system according to claim 3, in which the predetermined characteristic of the first filter is such that the frequency modulating signal has smooth transitions from one value to another in response to smooth transitions of the digital data from one value to another, and the predetermined characteristic of the second filter is such that the amplitude modulating signal has a smooth increase in amplitude in response to each said control signal followed by a smooth decrease back towards a datum amplitude until the next control signal occurs.

7. A method of transmitting digital data, comprising the steps of filtering the digital data in accordance with a first predetermined filter characteristic to produce a frequency modulating signal, frequency-modulating a carrier signal in dependence on the frequency-modulating signal, sensing the digital data to produce a control signal in response to each transition of the digital data, the polarity of each control signal being the same and being independent of the direction of the respective transition, filtering the control signal in accordance with a second predetermined filter characteristic to produce an amplitude modulating signal, and amplitude-modulating the frequency modulated carrier in dependence on the amplitude modulating signal to produce an output signal, the first and second predetermined filter characteristics being such that the frequency-modulating signal has smooth transitions from one value to another in response to a change in the digital data from one value to another and the amplitude modulating signal has a smooth increase in amplitude in response to each said control signal followed by a smooth decrease back towards a datum until the next control signal occurs, and the characteristics being mutually related so that the output signal has the form of a band-pass filtered signal.

8. A method of transmitting digital data, comprising the steps of frequency-modulating a carrier signal by shifting its frequency in dependence on changes in value of the digital data whereby to produce a first frequency-modulated carrier, band-pass-filtering the first frequency-modulated carrier in accordance with a predetermined filter characteristic to reduce the amplitudes of sideband signals on either side of the nominal carrier frequency, analysing the band-pass-filtered signal to obtain its time-varying amplitude and frequency deviations, generating frequency modulating and amplitude modulating signals respectively dependent on the time-varying frequency and amplitude deviations of the band-pass-filtered signal, frequency-modulating a carrier signal with the said frequency modulating signal whereby to produce a second frequency-modulated carrier, the frequency modulating signal having smooth transitions from one value to another in response to transitions of the digital data from one value to another, and amplitude-modulating the second frequency-modulated carrier with the said amplitude modulating signal, whereby to produce an output waveform having substantially the same time-varying frequency and amplitude deviations as in the band-pass-filtered signal, the amplitude modulating signal having a smooth increase in amplitude in response to each said control signal followed by a smooth decrease back towards a datum amplitude until the next control signal occurs.

* * * * *

UNITED STATES PATENT OFFICE
CERTIFICATE OF CORRECTION

Patent No. 4,199,821      Dated April 22, 1980

Inventor(s) Peter J. Munday

It is certified that error appears in the above-identified patent and that said Letters Patent are hereby corrected as shown below:

Column 8, line 6, change "control signal" to -- transition of the digital data --.

Column 8, line 8, change "control signal" to -- transition of the digital data --.

Column 6, delete Claim 6 (lines 13-24) in its entirety.

Claim 7, therefore, should be renumbered as Claim 6.

Claim 8, therefore, should be renumbered as Claim 7.

On the cover sheet below the abstract, "8 Claims" should read -- 7 Claims --.

*Signed and Sealed this*

*Twenty-eighth* Day of *October 1980*

[SEAL]

*Attest:*

SIDNEY A. DIAMOND

*Attesting Officer*     *Commissioner of Patents and Trademarks*